J. SANDSTROM.
SNAP HOOK.
APPLICATION FILED OCT. 31, 1918.
1,310,548.
Patented July 22, 1919.
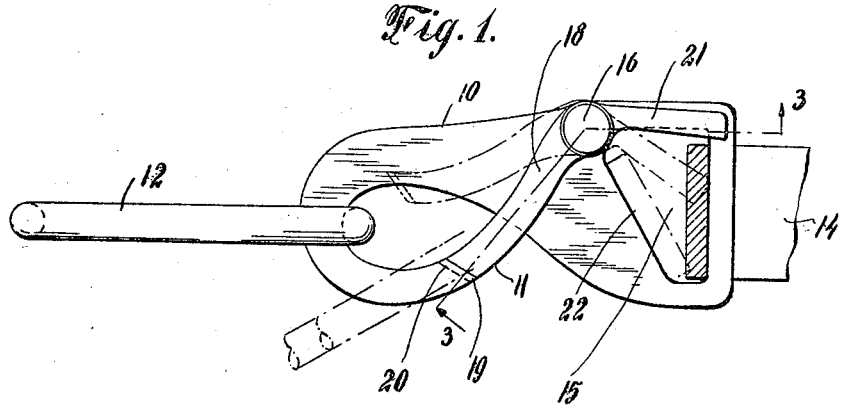
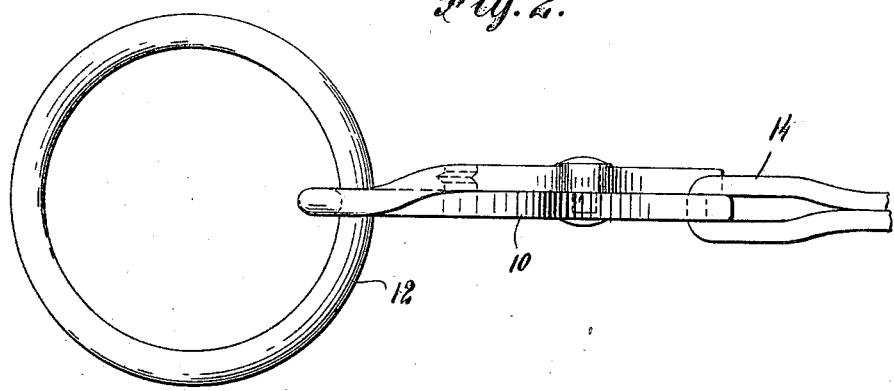
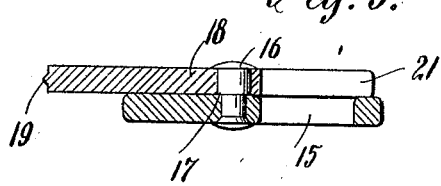
Inventor
John Sandstrom
By his Attorney
William Richards

UNITED STATES PATENT OFFICE.

JOHN SANDSTROM, OF ADAMS, NORTH DAKOTA.

SNAP-HOOK.

1,310,548.  Specification of Letters Patent.  Patented July 22, 1919.

Application filed October 31, 1918. Serial No. 260,491.

*To all whom it may concern:*

Be it known that I, JOHN SANDSTROM, a citizen of the United States, residing at Adams, county of Walsh, and State of North Dakota, have invented certain new and useful Improvements in Snap-Hooks of which the following is a specification.

This invention relates to snap hooks, and has for its object to construct such a device in a form in which the parts may be operated positively, without the use of springs or other resilient means, and which will, at the same time, be extremely simple, easy to manufacture, and efficient in use.

These and other objects of my invention are set forth in the following specification and shown in the accompanying drawings, which form a material part of this disclosure, and in which:

Figure 1 is a plan view of a snap hook made in accordance with my invention, the strap engaged therewith being shown in cross section;

Fig. 2 is a side elevational view of the same; and,

Fig. 3 is a longitudinal sectional view taken on the line 3—3 of Fig. 1.

Referring to the drawings, 10 is the hook portion, and 11 the snap of my improved snap hook, 12 being a ring held thereby, and 14 a strap engaged therewith.

The hook portion 10, may be of usual or ordinary construction except that an approximately triangular opening 15, is formed in said hook portion opposite the hook end thereof, the apex of the triangular opening being directed toward the hook.

The snap comprises a two-arm member pivoted, at or near its central portion, to the hook member 10, upon a pivot pin 16, which has a shoulder 17 engaging the side of said hook portion to facilitate separate movement of the snap upon said hook portion.

The arm 18 of the snap is curved, and the end thereof inclined angularly and provided with a tongue 19, for engaging with a correspondingly beveled end of the hook, which is formed with a groove 20 to receive said tongue 19. The other arm 21 of the snap is so formed that it will extend along the side of the hook member, to a point somewhat beyond the triangular opening 15, and substantially parallel therewith when the snap is in a closed position with relation to said hook and is so arranged that it will be held in this position by the strap 14 when the latter is inserted through the opening 15, in the normal position as shown in Fig. 1.

In operation, when it is desired to open the snap to engage or release the ring 12 or other object, it is only necessary to move the parts into the positions shown in dotted lines in Fig. 1. That is to say, the strap being held, the hook portion is moved around so that one end of the strap will swing in the arc of a circle in said opening and will lie against the inclined side 22 of the triangular opening 15, when the snap may be turned upon its pivot pin 16, opening the hook. When the parts are returned to their normal positions the strap 14, pressing against the arm 21 of the snap member will close the hook and hold the parts in their closed positions.

What I claim as new and desire to secure by Letters Patent is:

1. A snap hook comprising a hook member having an approximately triangular opening in its end opposite the hook to receive a strap, and a two-armed snap pivoted to said hook member at a point adjacent to said opening, one of said arms being adapted to engage said hook member to close the same, the other of said arms extending along one side of said opening to a point enabling it to be engaged by said strap.

2. A snap hook comprising a hook member having an approximately triangular opening, the apex of which is directed toward the hook, and a two-armed snap pivotally attached to said hook member at a point adjacent to said opening, one of said arms being adapted to close said hook member, the other of said arms extending along one side of said opening and to a point beyond the same.

3. A snap hook comprising a hook member having an approximately triangular opening in its end opposite its hook, the apex of said opening being directed toward the hook, the end of which is inclined and provided with a groove and a two-armed snap pivoted to said hook member at a point adjacent to said opening so that one of its arms will normally extend along one side of said opening and parallel therewith, the other of said arms being curved and provided with a tongue for engagement with the groove in said hook.

4. A snap hook comprising a hook member having an opening in its end opposite its hook formed to admit of a swinging motion of a strap contained therein, and a two-armed snap member pivotally secured to one side of said opening, one of the arms of which is adapted to close the hook of said hook member, and the other arm thereof extending along one side of said opening to a point enabling it to be engaged by said strap.

In testimony whereof, I have signed my name to this specification, this 1st day of July 1918.

JOHN SANDSTROM.

Witnesses:
A. J. FELT,
CLARENCE JEGLUM.

Copies of this patent may be obtained for five cents each, by addressing the "Commissioner of Patents, Washington, D. C."